United States Patent
Burch

[15] 3,706,408
[45] Dec. 19, 1972

[54] FEEDING AND CONVEYING DEVICE FOR AUTOMATIC NAILING MACHINES

[72] Inventor: Randolph Burch, Summit Point, W. Va. 25446

[22] Filed: Dec. 8, 1970

[21] Appl. No.: 96,168

[52] U.S. Cl. .................................. 227/45, 227/100
[51] Int. Cl. ............................................ B27f 7/02
[58] Field of Search .......... 227/39, 40, 44, 45, 48, 50, 227/99, 100, 101, 3, 7, 2

[56] References Cited

UNITED STATES PATENTS

| | | | |
|---|---|---|---|
| 1,463,727 | 7/1923 | Shellenberger | 227/45 |
| 3,591,067 | 7/1971 | Vial | 227/100 X |
| 1,123,250 | 1/1915 | Crebbin | 227/45 |
| 1,504,891 | 8/1924 | Hill | 227/45 |
| 1,669,383 | 5/1928 | Thompson | 227/3 |

*Primary Examiner*—Granville Y. Custer, Jr.
*Attorney*—Holman & Stern

[57] ABSTRACT

A device for use in the assembly of pallets, and particularly for feeding and conveying transverse pallet stringers and longitudinal deck boards in assembled, unsecured relationship to an automatic nailing machine for nailing the stringers and deck boards together. The device includes longitudinal chain conveyors at either side of the device, each chain conveyor having a plurality of push dogs in longitudinal spaced relationship, each corresponding pair of push dogs engaging and conveying a transverse pallet stringer. The endless chain conveyor further includes trip dog means adapted to trip a stationary limit switch, and hopper means for a plurality of stacks of longitudinal deck boards, in which the trip dog means of the chain will engage the limit switch, and activate a longitudinal push bar for the deck boards at the bottom of each stack, whereby such deck boards will be moved from the bottom of each stack in the hopper in assembled relationship onto the top of a plurality of stringers and presented to the nailing machine for final assembly.

12 Claims, 6 Drawing Figures

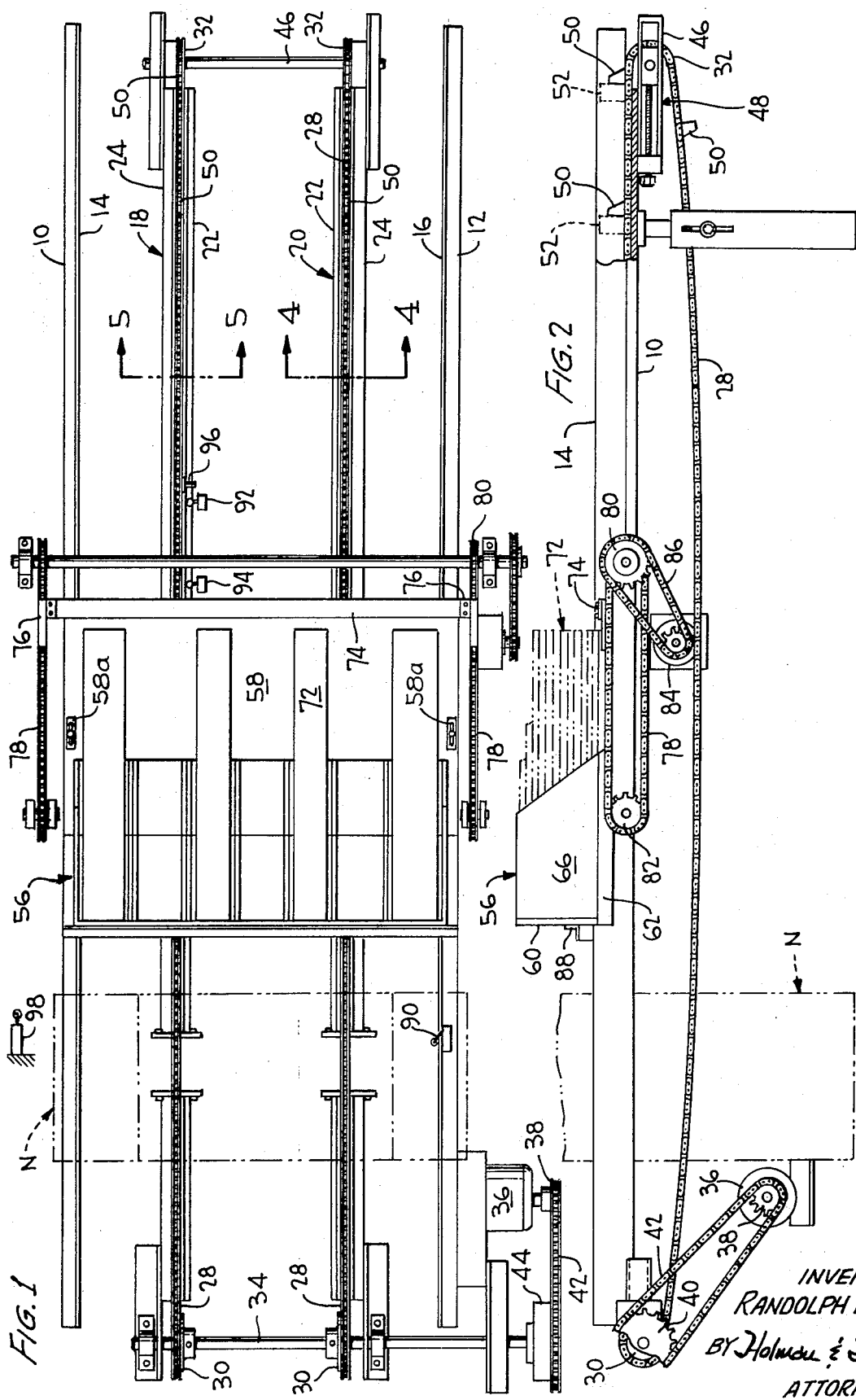

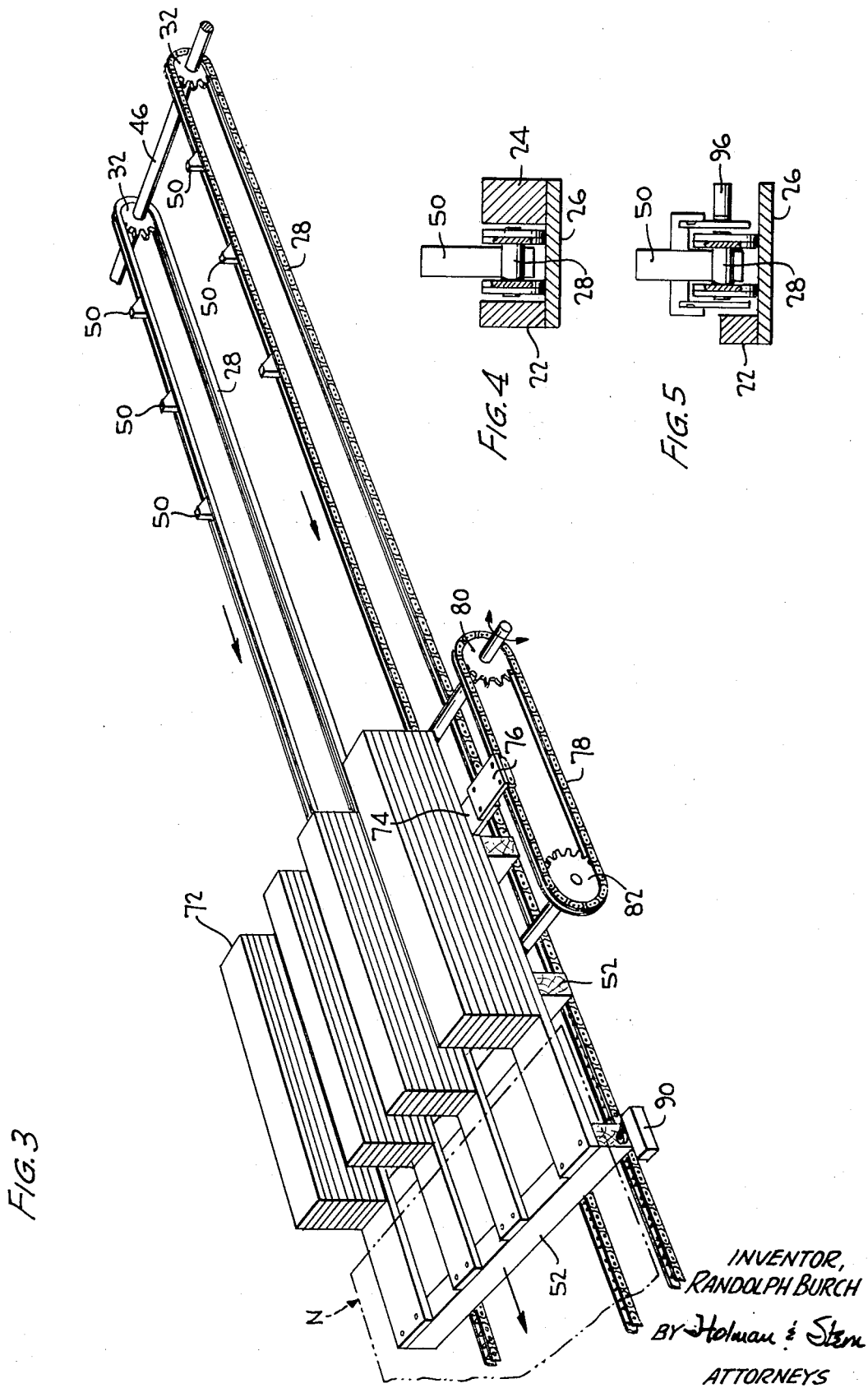

INVENTOR,
RANDOLPH BURCH
BY Holman & Stern
ATTORNEYS

FEEDING AND CONVEYING DEVICE FOR AUTOMATIC NAILING MACHINES

BACKGROUND OF THE INVENTION

This invention relates generally to conveying and feeding devices, and more particularly to a device for feeding a plurality of transversely oriented pallet stringers and a plurality of longitudinally oriented deck boards in assembled relation to an automatic nailing machine or the like, for use in manufacturing wooden pallets. Such pallets are customarily used for supporting and transporting merchandise, and are particularly adapted to be handled by means of fork lift type handling equipment. The pallets generally comprise a plurality of transverse pallet stringers, forming a supporting base and each customarily having cross-sectional dimensions on the order of 2 X 4 inches, and a plurality of longitudinal deck boards or slats secured to the stringers and forming a loadsupporting surface on at least one face of the pallet, and customarily on both faces thereof, such deck boards having cross-sectional dimensions on the order of 1 X 4 or 1 X 6 inches.

Various machines for assembling such pallets have been well-known and considerably developed in the art, the most common types of such machines comprising various forms of automatic or semi-automatic nailing machines for assembling the pallet stringers to the deck boards forming one or two supporting surfaces. While the nailing machines known in the art are quite efficient in accurately and rapidly nailing the deck boards to the pallet stringers, they require that the stringers and deck boards first be presented thereto in assembled relation, so that nails or other fastening devices may be applied to the stringers and deck boards for fastening them together. In some instances, the pallet stringers and deck boards have been assembled manually, and presented to the nailing machine by means of a conveyor or the like, and held in position during the nailing operation.

In other known nailing machines, it has been proposed to provide automatic or semi-automatic means for feeding the pallet stringers and deck boards to the nailing machine in assembled or partially assembled relationship, in order to substantially eliminate the manual labor factor; however, such known proposed devices have not been entirely successful, and particularly have been extremely expensive and complicated, as well as failing to permit adjustment of the device for assembling pallets of varying sizes and configurations.

SUMMARY OF THE INVENTION

With the above background as a reference, it is accordingly a primary object of the present invention to provide a feeding and conveying device for particular use in conjunction with an automatic or semi-automatic nailing machine, which device automatically feeds the pallet stringers and deck boards to the nailing machine in assembled relationship so that the nailing operation can be performed rapidly and accurately.

It is a further object of the present invention to provide such a feeding and conveying device which is capable of fully automatic operation, respectively feeding pallet stringers and deck boards from sources of supply of each and assembling these into their proper relationship, ready for nailing.

It is still a further object of the present invention to provide such a feeding and conveying device for a nailing machine, which is capable of adjustment in order to assemble pallets or the like of varying dimensions.

Still a further object of the present invention is to provide a feeding and conveying device of the general character described for use in conjunction with an automatic nailing machine, which is extremely simple in its manufacture and operation, and permits rapid and accurate assembly of pallets of a specified size for presentation to the automatic nailing machine.

These, as well as other objects which will become apparent as the description proceeds, are implemented by the inventive feeding and conveying device for use in conjunction with, for example, an automatic nailing machine, comprising a pair of oppositely disposed chain conveyors, each of the conveyors having secured thereto for movement therewith a plurality of longitudinally spaced push dogs for engaging and conveying respective transverse pallet stringers; a hopper for storing a plurality of layers of longitudinally aligned deck boards; together with feed means for feeding the deck boards onto the top of the transverse pallet stringers; and sensing and control means for synchronizing the operation of the chain conveyors, the deck board hopper and its associated feeding device, and the nailing machine, in order to properly assemble the deck boards in a layer upon the stringers. In a preferred embodiment of the invention, the device additionally includes limit switches which are contacted by the conveyed stringers in order to actuate various phases of the operation of the device.

BRIEF DESCRIPTION OF THE DRAWINGS

The invention itself will be better understood, and additional objects, advantages and features thereof will become apparent, from the following detailed description of a preferred embodiment of the invention, taken in conjunction with the accompanying drawings, in which:

FIG. 1 is a top plan view of a feeding and conveying device constructed according to the present invention;

FIG. 2 is a side elevational view, partially broken away, of the device shown in FIG. 1;

FIG. 3 is a perspective view of the device of FIG. 1, with parts removed for clarity of illustration; and FIG. 4 is a transverse sectional view through one of the chain conveyors, of the device shown in FIG. 1, taken along lines 4—4 of FIG. 1;

FIG. 5 is a transverse sectional view through the other chain conveyor, taken along lines 5—5 of FIG. 1.

DETAILED DESCRIPTION OF THE PREFERRED EMBODIMENT OF THE INVENTION

Figure 6:
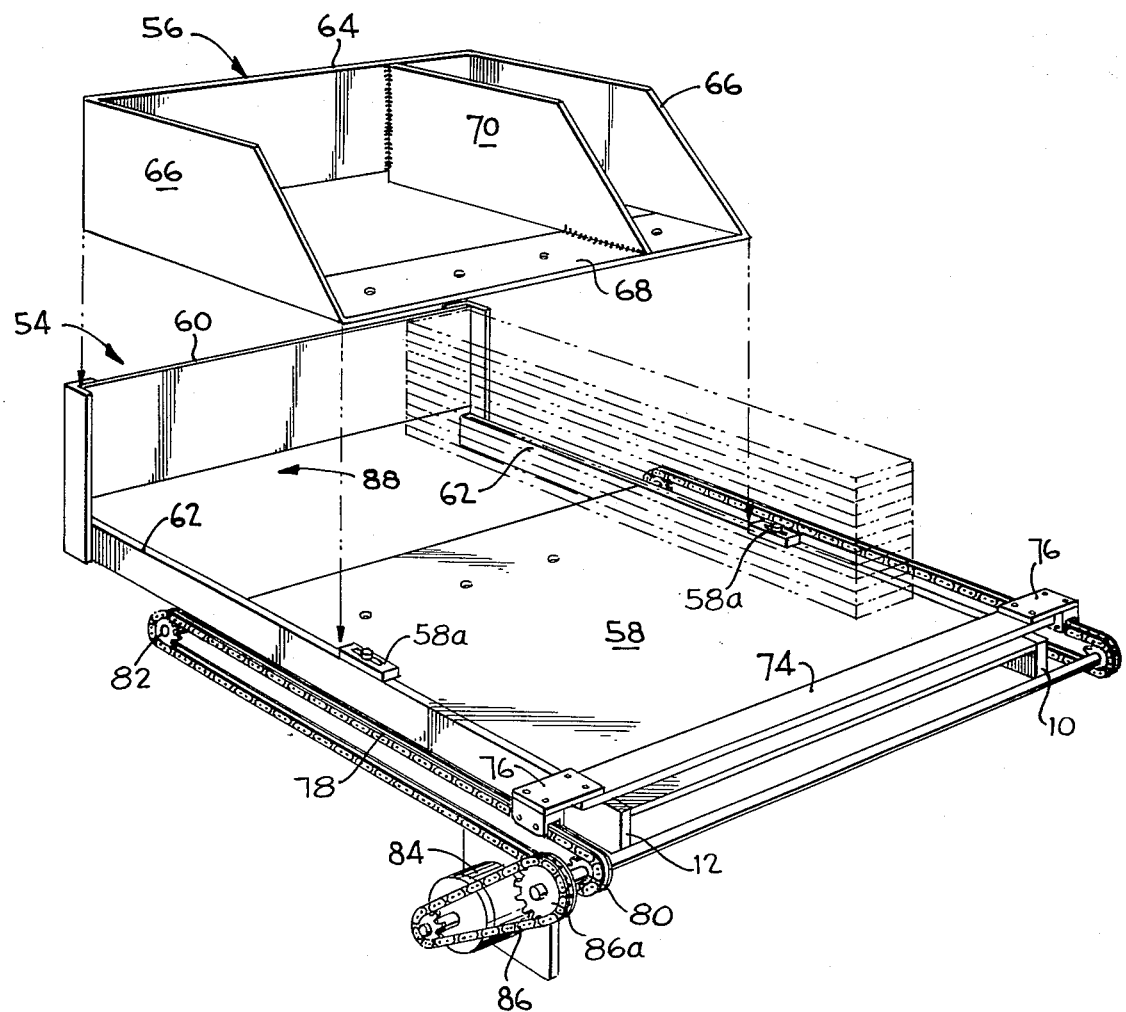
FIG. 6 is an exploded pictorial view showing details of the deck board hopper.

Referring now to the drawings, there is shown in FIGS. 1–3 a preferred embodiment of feeding and conveying device constructed according to the present invention, finding particular utility in combination with a conventional automatic or semi-automatic nailing machine, designated generally by reference character N, and indicated schematically in dashed lines in the drawing. Such nailing machines, as discussed above, and reference is made to U.S. Pat. Nos. 2,197,363 and 3,273,776 are well-known in the art, and accordingly form no part of the present invention. It should be understood, however, that such a conventional nailing machine would customarily include a carriage movable vertically with respect to the conveyor, to be described in greater detail below, such carriage including a nailing head having means to drive a plurality of nails either sequentially or simultaneously into the pallets in a suitable array to secure together the elements of the pallet, and drive and control means for such carriage and nailing head, a part of which control means forms part of the present invention and will be described in greater detail below.

As shown, the feeding and conveying device according to the present invention comprises a pair of longitudinally extending elongated side guide rails 10 and 12 disposed along the opposite sides of the device. Each of these side guide rails includes an upstanding wall portion or flange 14 and 16, respectively, which serves to guide the opposite ends of transverse pallet stringers conveyed along the device, as will be described in greater detail hereunder. Preferably, each of the side guide rails 10 and 12 may advantageously be constructed as an L-beam of suitable length. Disposed between the side guide rails and also extending longitudinally of the device are a plurality of laterally spaced endless chain conveyors, herein shown as comprising a pair of endless chain conveyor means 18 and 20, spaced from each other laterally, which serve to convey transversely oriented pallet stringers along the device to the nailing machine N. Endless chain 18 has attached thereto trip dogs 96 which engage limit switches to control the forward and reverse movement of push bar 74. Chain 28 travels in a guide as shown in FIG. 5 with side member 24 removed. The endless chain conveyor 20 includes a generally U-shaped guide means, best seen in FIG. 4, which comprises a pair of spaced parallel upstanding wall members 22, 24, and a base member 26 connecting the bases of the wall members 22 and 24, thus defining a generally U-shaped elongated channel therebetween. Each of the endless chain conveyor means 18 and 20 further includes an endless chain conveyor member, which conveyor member as illustrated, preferably comprises an endless flexible hollow pin chain 28 disposed about a pair of sprockets 30, 32 disposed at the opposite ends of the device. As illustrated in FIGS. 1 and 2, both of the sprockets 30 at the left or discharge end of the device are secured to a common transverse rotatable shaft 34, and such shaft 34 is driven from a suitable drive means such as electric motor 36, by means of a driving sprocket 38 secured to the motor, a driven sprocket 40 mounted coaxially with the shaft 34, and a driving transmission means such as a chain 42 passed about the sprockets 38 and 40. While it is possible that the driven sprocket 40 may be drivingly secured directly to the shaft 34, and the electric motor energized intermittently, it is preferred from the standpoint of simplicity of construction and operation that such driving connection be made indirectly through an intermediate electric brake and clutch unit 44, in order to permit intermittent driving of the shaft 34 and hence intermittent operation of the conveyors 18 and 20, while permitting the motor 36 to operate substantially continuously. At the right or receiving end of the device, the sprockets 32 are secured to a rotatable idler shaft 46, which shaft is rotatably journaled within the frame of the device by any suitable means. Preferably, as shown, such idler shaft 46 may be longitudinally adjustable with respect to the frame, as best seen in FIG. 2, by means of suitable tensioning means 48, whereby the tension of each of the endless flexible chains 28 may be adjusted as necessary.

Secured to each of the endless flexible chains 28 at longitudinally spaced intervals are a plurality of push dogs 50. These push dogs are preferably disposed longitudinally such that one push dog on each of the chains 28 will be at the same longitudinal position as one of the push dogs on the other of the chains 28, whereby such push dogs will form a cooperating pair which together will engage the opposite ends of a transversely disposed pallet stringer 52, shown in dotted lines in FIG. 2, and thus convey such pallet stringer towards the nailing machine N. Such pallet stringers, as described in the introduction, form the supporting base for the pallet being assembled, and may, for example, comprise suitable lengths of 2 × 4 inch timber or the like.

The number of push dogs 50 secured to each endless flexible chain 28, as well as the longitudinal spacing and positioning of such push dogs 50 relative to one another, is adjustable so that the number and spacing of the transverse pallet stringers 52 may likewise be selected. In this manner, it will be appreciated that a pallet of any desired dimensions may be assembled merely by changing the positioning of the push dogs 50 upon the endless flexible chains 28.

Means are further provided for assembling a plurality of longitudinally disposed deck boards or slats onto the top of the transversely disposed pallet stringers, in order to present such assembled stringers and deck boards to the nailing machine. Generally, as will be described in greater detail hereunder, such means includes a hopper 54 for storing a supply of such deck boards in stacked relationship, feeding means for feeding the bottom-most layer of deck boards onto the stringers 52, and synchronizing and control means for synchronizing the operation of such feed means with the operation of the chain conveyors 18 and 20.

As best seen in FIG. 6, the hopper for the deck boards preferably comprises a hopper base designated generally by reference numeral 54, which rests at its opposite sides upon the side guide rails 10 and 12 and is secured thereto in any suitable manner, and a hopper insert member 56 which is detachably secured to the hopper base 54, as for example by means of bolts. The hopper base 54 comprises a substantially flat base plate member 58 which serves to support the stacks of deck boards thereupon and which extends transversely the width of the device and an upstanding transverse rear wall member 60 spaced rearwardly from the rear edge of the base plate 58 and connected thereto by means of a pair of longitudinally extending bracket members 62 at either side thereof. A pair of adjustable stops 58a are provided on the base plate member 58 with such stops being at the same longitudinal position. The lower transverse edge of the rear wall member is positioned above the level of the top of the base plate by a distance slightly greater than the vertical thickness of a single layer of deck boards, whereby there will in effect be provided a narrow transverse discharge slot for the bottom layer of deck boards, in a manner which will be described more fully hereunder. It should also be appreciated that there will also be defined a horizontally oriented open space between the rear edge of the base plate 58 and the rear wall 60.

The hopper insert member 56 preferably comprises an upstanding transverse rear wall 64 substantially corresponding in dimensions to the rear wall 60 of the hopper base, a pair of upstanding side walls 66, and a narrow transverse bracket member or plate 68 connecting the forward bottom portions of the side walls 66. It should thus be appreciated that with the exception of the transverse plate 68, the insert member 56 is bottomless. The side walls 66 are of such length that when the respective rear walls 60 and 64 are juxtaposed, the transverse plate 68 will extend over and rest upon the rear portion of the base plate 58 and may be readily secured thereto, as by bolts lodged in aligned apertures in the plates 68 and 58. Additionally, the rear walls 60 and 64 may likewise be secured together in the same manner. It should be noted that the bottom of the rear wall 64 is elevated above the transverse plate 68 so as to form a rear transverse slot aligning with that in the hopper base when the base and insert are assembled.

Additionally, the hopper insert member 56 may advantageously comprise one or more longitudinal upstanding divider members 70 welded or otherwise secured thereto, in order to provide lateral support and guiding for the deck boards, and to keep the individual stacks of boards properly separated. It is contemplated that a plurality of such hopper insert members may be kept on hand, each of these having a different array of dividers 70 secured thereto, so that any desired pattern of deck boards may be readily set up merely by interchanging the respective hopper insert members 56.

As best seen in FIG. 3, the deck boards 72 are disposed in a plurality of stacks in the hopper. More particularly, the bottom deck boards of the stacks form a bottom layer, which layer, as will be described, is ejected from the bottom of the stack in order to form a single deck for a pallet.

Feeding and ejecting means are provided for feeding such bottom-most layer of deck boards 72 from the hopper, in the direction of movement of the endless chains 28 and hence of the stringers 52. As illustrated, such feeding and ejecting means comprises the transverse push bar 74 which is disposed at the right or trailing side of the hopper, at substantially the height of the lower-most layer of deck boards 72 and which preferably corresponds in vertical thickness substantially to the thickness of the deck boards 72 in such bottom layer. The push bar 74 extends transversely across the front end of the hopper and is secured at its opposite ends to a pair of bracket members 76, which in turn are secured to the upper run of respective driving chains 78 disposed at the opposite sides of the device. These driving chains are each trained about respective forward and rearward sprockets 80 and 82, and are reversibly driven in order to reversibly reciprocate the push bar 74, by means of a reversible drive means such as reversible hydraulic motor 84, drivingly connected with one of the sprockets 80 by means of an intermediate drive chain 86 and sprocket 86a on the shaft of sprocket 80. When the motor 84 is energized in its forward direction, by means to be described hereafter, the push bar 74 will be moved forwardly to the adjustable stops 85a, i.e. towards the left as shown in FIGS. 1 through 3, and will push all of the deck boards 72 in the lower-most layer in that same direction, through the lateral discharge opening or slot 88 extending transversely across the entire width of rear wall 60 of the hopper into proper nailing position. The lateral discharge slot 88 is of such a height as to permit feeding of only a single layer of deck boards 72 therethrough. After the deckboards are nailed to the first stringer, the deckboards are pulled from the hopper by the conveyor as will later be described. It will be understood that the base plate 58, the push bar 74, and the rearward transverse discharge slot 88 are located at suitable levels such that the bottom layer of deck boards will be discharged so as to rest upon the transverse pallet stringers 52 when these stringers are in proper position thereunder and such deck boards will be disposed perpendicularly to the stringers.

A first limit switch 90 is provided on one of the side guide rails 12 in the immediate vicinity of the nailing machine N, which limit switch 90 serves to control the operation of the chain conveyors 18 and 20, and the nailing machine N. In particular, the limit switch 90 is located so as to be tripped by the leading transverse pallet stringer 52 of the plurality of stringers being assembled, and is operatively connected with the electric brake and clutch unit 44 for the endless chain conveyors 18 and 20, and the vertically moveable carriage of the nailing machine N, in such a manner that when the leading stringer 52 trips the limit switch 90, the endless chain conveyors 18 and 20 will be stopped, through the intermediate electric clutch and brake unit 44, and the nailing machine N is also activated.

Second and third limit switches 92 and 94 are mounted on the frame of the machine and are adapted to be successively tripped by a plurality of longitudinally spaced trip dogs 96 mounted on the chain conveyor 18 and corresponding in number to the number of stringers 52 forming a single pallet (only one such trip dog 96 has been illustrated in FIG. 1, for the sake of clarity). The limit switches 92 and 94 and trip dogs 96 are so positioned that the leading trip dog will be actuated when the leading stringer is positioned beneath the hopper, i.e., in a position to receive deck boards thereon.

The second and third limit switches 92 and 94 are operatively connected to a suitable control valve, not shown, for the hydraulic motor 94, and respectively initiate forward and reverse rotation of the motor and hence movement of the push bar 74. When the leading trip dog 96 trips the limit switch 92, the hydraulic motor 84 will be actuated for forward rotation, thus moving the push bar 74 forwardly to the stops 58a and pushing the lowermost layer of deck boards 72 onto the stringer in proper nailing position. Additionally, the nailing machine N, activated by the limit switch 90, nails all of the deck boards in this lowermost layer to the stringer. Then, upon movement of the endless chains 28 when the trip dog 96 is conveyed to a point where it trips the limit switch 94, the hydraulic motor 84 will be reversed and will return push bar 74 to its original position, permitting the next layer of deck boards 72 to drop onto the base plate, ready for a subsequent pallet to be formed.

It is preferred that the trip dogs 96 be adjustable in position relative to the conveyor chain 18, as well as in number, in the same manner as the push dogs 50, so that the machine may be quickly and easily set up for any particular size or configuration of pallet desired to be assembled.

A further limit switch 98 is also provided, disposed so as to be tripped by the vertically moveable carriage of the nailing machine N when it returns to its "home" position, to deactivate the electric brake and clutch unit 44 and hence resume forward longitudinal movement of the endless chain conveyors 18 and 20, and move the partially assembled pallet onward so that the next succeeding stringer 52 will then again trip limit switch 90 to activate the nailing machine N.

It is believed that the operation of the device of the present invention should be apparent from the above description of its construction; however, such operation will be briefly reviewed hereunder for the sake of clarity. Initially, it will be assumed that the side guide rails 10 and 12, the trip dogs 96, the push dogs 50, and the hopper insert 56 have all been positioned to set up the inventive device for assembling pallets of a particular desired size, and that a suitable number of the deck boards 72 have been stacked into the hopper 54. The transverse pallet stringers 52 are fed into the right or receiving end of the endless chain conveyors 18 and 20 by suitable means, not shown, so as to be respectively engaged by the pairs of push dogs 50 at the opposite sides of the device, mounted upon the respective endless flexible conveyor chains 28. For the sake of example, it will be assumed that pallets will be constructed of three such transverse pallet stringers 52, to which four longitudinal deck boards 72 will be nailed. The stringers 52 advance towards the left, under the influence of the push dogs 50, beneath the hopper with the leading trip dog 96 actuating the leading limit switch 92 to energize the hydraulic motor 84 in its forward direction, thus moving the push bar 74 forwardly together with the lower-most layer of deck boards until the bar 74 engages the adjustable stops 58a thus moving the deckboards into proper nailing position onto the top of the stringers. When the lead stringer trips the first limit switch 90, this switch deactivates the clutch and activates the brake of the electric clutch and brake unit 44 to stop movement of the endless chain conveyors 18 and 20 and hence of the transverse stringers 52 and the nailing machine N is likewise activated by the limit switch 90, and the deck boards are thereby nailed to the lead stringer. Then, when the vertically moveable carriage of the nailing machine N returns to its home position, the limit switch 98 will be tripped, de-energizing the brake and clutch unit 44 and hence resuming forward movement of the endless chain conveyors 18 and 20. The stringers 52 will then be advanced by the push dogs 50 secured to the conveyors; additionally, since the deck boards 72 have been nailed to the leading transverse stringer 52, such deck boards will also be advanced along with the stringers. At the same time, forward movement of the chain conveyor will cause the leading trip dog 96 to then trip the limit switch 94, reversing the hydraulic motor and thus returning the push bar 74 to its original position.

When the second stringer 52 reaches the limit switch 90, this limit switch is again tripped to initiate the nailing action of the nailing machine N and thus nail the deck boards to the second stringer. This operation is similarly repeated with the third or final stringer, and the thus assembled pallet is then conveyed off the discharge end of the endless chain conveyors 18 and 20 to further means where, if desired, the pallet may be reversed and deck boards applied to the opposite face of the pallet by essentially the same procedure described above.

It should now be appreciated that the inventive feeding and conveying device provides a means for rapidly and accurately, in an automatic manner, assembling transverse pallet stringers and longitudinal deck boards to each other in proper orientation for presentation to any conventional nailing machine. As described above, the device may be readily adjusted to permit any number and/or spacing of the transverse pallet stringers, as well as any number and/or spacing of the longitudinal deck boards. Additionally, it should also be appreciated that the deck boards are laid upon the stringers in an accurate manner, and are equally accurately presented to the nailing machine for nailing the deck boards to each successive stringer.

Through the provision of a feeding and conveying device in combination with a nailing machine, according to the description above, it is believed apparent that all of the objects set forth at the outset to the specification have been successively fulfilled.

Accordingly, what is claimed is:

1. A feeding and conveying device for feeding stringers and deck boards to an automatic nailing machine for assembly into wooden pallets, comprising conveyor means for feeding a plurality of stringers to the nailing machine in parallel spaced relations; first drive means for driving said conveyor means; a hopper for receiving and storing a plurality of stacks of deck boards in parallel spaced relation and perpendicular to the conveyed stringers; feeding means moveable relative to the hopper for simultaneously feeding the lower-most deck board of each stack in a layer from said hopper onto the stringers; second reversible drive means for moving said feeding means; first control means actuated by the conveying means to activate said second drive means to move the feeding means for feeding the lower-most deck board of each stack in a layer onto the stringers, second control means actuated by the leading stringer when said stringer is in nailing position to stop the first drive means and hence the conveyor means and actuate the nailing machine to nail the deck boards to the leading stringer, and third control means actuated by the nailing machine after the deck boards have been nailed to the stringers to actuate the second drive means to move the feeding means in the opposite direction to be in position to feed the lower-most deck board of each stack in a layer from the hopper onto the stringers of a further wooden pallet;

2. The feeding and conveying device as defined in claim 1, wherein said conveyor means comprises a pair of spaced parallel endless chain conveyors.

3. The feeding and conveying device as claimed in claim 2, wherein each of said chain conveyors comprises a plurality of upstanding push dogs secured thereto, each of said upstanding push dogs engaging and conveying a respective end of one of the stringers.

4. The feeding and conveying device as defined in claim 3, wherein each of said upstanding push dogs is longitudinally adjustable in position with respect to its respective conveyor chain, whereby the longitudinal spacing of the stringers may be adjusted.

5. The feeding and conveying device as defined in claim 1, wherein said feeding means comprises a transverse push bar disposed adjacent the bottom of said hopper parallel to and substantially at the height of the lower-most deck boards, said second drive means comprising an endless conveyor chain secured to at least one end of said push bar and reversible drive motor means driving said conveyor chain, whereby said reversible drive motor means may effect reciprocating movement of said push bar relative to said hopper.

6. The feeding and conveying device as defined in claim 1, wherein said first drive means comprises an electric brake and clutch unit connected to said conveyor means, and electric drive motor means driving said conveyor means through said electric brake and clutch unit, and said second control means comprising at least one limit switch adapted to be tripped by a stringer when that stringer reaches a position to be nailed by the nailing machine, and said limit switch being operatively connected with said electric brake and clutch unit.

7. The feeding and conveying device as defined in claim 6, in which said third control means includes a further limit switch operatively connected with said first drive means to impart movement to said conveyor means following the nailing operation, whereby succeeding stringers will be presented to the nailing machine.

8. In combination with an automatic nailing machine for nailing transverse stringers and longitudinal deck boards together for assembly of wooden pallets, a feeding and conveying device for feeding stringers and deck boards to said nailing machine, said feeding and conveying device comprising conveyor means for feeding a plurality of stringers to the nailing machine in parallel spaced relation; first drive means moving said conveyor means; a hopper for receiving and storing a plurality of stacks of deck boards in parallel spaced relation and perpendicular to the conveyed stringers; feeding means moveable relative to said hopper for simultaneously feeding the lower-most deck board of each stack in a layer from said hopper onto the stringers; second reversible drive means for moving said feeding means; first control means actuated by the conveying means to activate said second drive means for moving the feeding means and hence the lower-most deck board of each stack in a layer from the hopper onto the stringers, second control means actuated by the leading stringer when the leading stringer is in nailing position to stop the first drive means and hence the conveyor means and actuate the nailing machine to nail the deck boards to the leading stringer, and third control means actuated by the nailing machine after nailing of the deck boards to the stringers operably connected to the second reversible drive means to actuate said second drive means to move the feeding means in the opposite direction to be in position to feed the lower-most deck board in each stack in a layer from the hopper onto stringers of a further pallet.

9. In combination with a nailing machine, a feeding and conveying device as defined in claim 8, wherein said conveyor means comprises a pair of oppositely disposed parallel endless conveyor chains.

10. In combination with a nailing machine, a feeding and conveying device as defined in claim 9, wherein each said endless conveyor chains comprises a plurality of upstanding push dogs longitudinally spaced along said respective conveyor chain, each of said push dogs being adapted to engage a respective end of one of the stringers to thereby convey the stringer to the nailing machine.

11. In combination with a nailing machine, a feeding and conveying device as defined in claim 10, wherein each said upstanding push dogs is longitudinally adjustable with respect to its respective conveyor chain, whereby the spacing of the stringers may be adjusted.

12. In combination with a nailing machine, a feeding and conveying device as defined in claim 8, wherein said feeding means comprises a transverse push bar disposed adjacent the bottom of said hopper at substantially the level of the lower-most deck boards therein, said push bar being adapted for reciprocal horizontal movement relative to said hopper to discharge lower-most deck boards therefrom onto the stringers.

* * * * *